3,592,812
7 - (1 - AMINOCYCLOALKYLCARBOXAMIDO) CEPHALOSPORANIC ACIDS AND RELATED COMPOUNDS

Harvey E. Alburn, West Chester, and William Dvonch, Chester, Pa., assignors to American Home Products Corporation, New York, N.Y.
No Drawing. Filed Dec. 6, 1968, Ser. No. 782,005
Int. Cl. C07d 99/24
U.S. Cl. 260—243      5 Claims

ABSTRACT OF THE DISCLOSURE

Novel 7 - (1-aminocycloalkylcarboxamido)cephalosporanic acids, including aliphatic and aryl-cycloalkyl ring substituted cephalosporanic acids are prepared. The compounds have useful antibiotic activity.

---

This invention relates to novel semisynthetic cephalosporanic acids and related compounds useful as antibiotic agents.

The compounds of the invention fall within the scope of the structural formula and its particular meaning as given below:

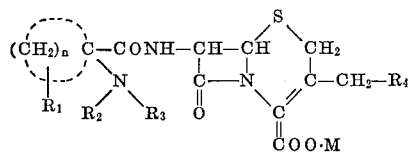

In the above formula $n$ stands for the numeral 4 or 5; $R_1$ stands for hydrogen, lower alkyl of 1 to 4 carbon atoms, lower alkoxy preferably of 1 to 2 carbon atoms, benzyl, or benzyloxy; $R_2$ represents hydrogen or methyl; $R_3$ represents hydrogen or o-nitrophenylthio; $R_4$ stands for hydrogen, acetoxy, or hydroxy; M represents hydrogen or a pharmaceutically acceptable cation, for example, sodium. Compounds deemed to be the equivalent of the compounds described are those where $R_1$ may additionally represent hydroxy, lower alkoxy or a halogen such as chlorine, bromine, or fluorine; and $R_2$ another lower alkyl but having no more than 3 carbon atoms, a lower acyl radical of 1 to 3 carbon atoms or a monocyclic aryl radical.

The compounds are prepared in the following way:

An aminocycloalkylcarboxylic acid is reacted with o-nitrobenzenesulfenyl chloride. The carboxylic acid compound resulting is then isolated in relatively pure form as a dicyclohexylamine salt. The isolated compound is acidified and then reacted with ethyl chloroformate to form a mixed acid anhydride. This compound is now reacted with the desired 7-aminocephalosporanic acid (7-ACA) or its equivalent forming the corresponding cephalosporin. Using thiophenol in a pyridine solution of the acid forms the 1-aminocycloalkylcarboxamido-cephalosporanic acid or cephalosporinate. The reactions may be more easily understood by the following schematic procedure:

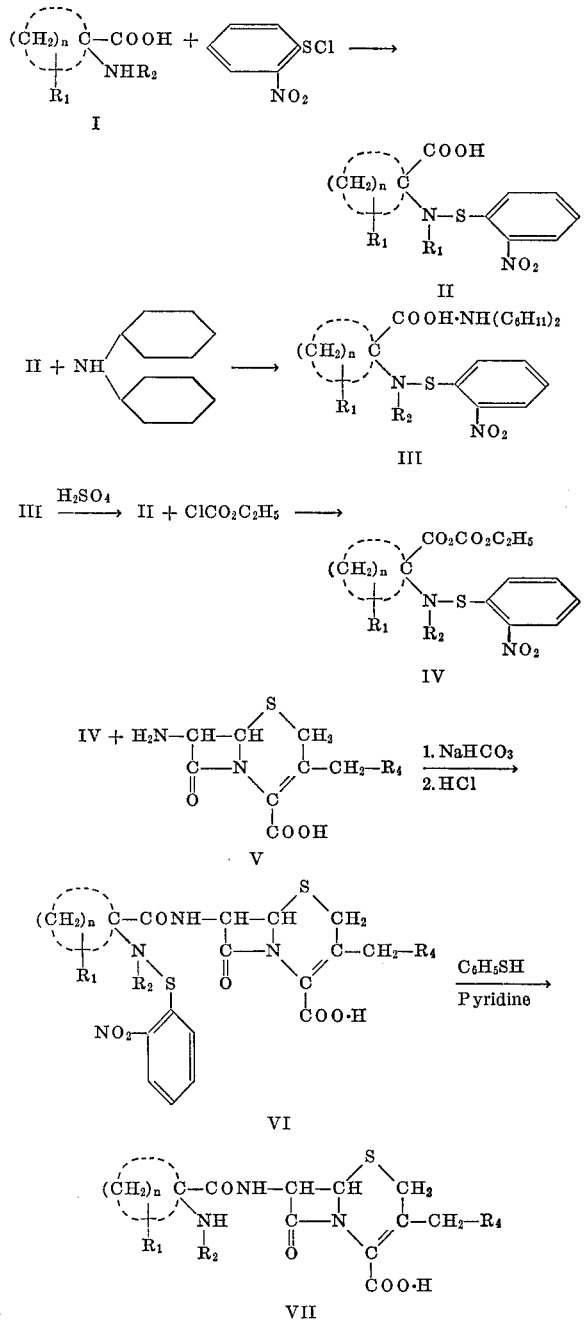

In the above series of reactions, the meanings for $n$, $R_1$, $R_2$, $R_3$, and $R_4$ remain as already described. The starting compounds in most cases are either known or the method of preparation is described in the literature. Certain starting aminocycloalkylcarboxylic acids may be prepared using the method described in substantial detail in the application of Fletcher and Alburn, Ser. No. 646,803 filed June 15, 1967.

The Fletcher et al. procedure prepares aminocycloalkylcarboxylic acids by first forming an alicyclic hydantoin. This is done by reacting a selected cycloalkanone with ammonium carbonate and potassium cyanide in an aqueous alcoholic reaction medium and then acidifying the mixture and obtaining a hydantoin precipitate. The latter is refluxed in the presence of sulfuric acid and on completion of the reaction, the mixture is neutralized with barium hydroxide; or the hydantoin, barium hydroxide and water are heated to refluxing or about 200° C. The desired aminocycloalkylcarboxylic acid is obtained after adjustment of the pH to about 4.5 and removal of the solids.

The following example will specifically illustrate the general procedure described above for preparing a typical compound falling within the scope of starting compound I. In this or other examples, units are in the metric system and therefore, temperatures are in degrees centigrade.

EXAMPLE 1

Preparation of 1-amino-2-benzyloxycyclohexanecarboxylic acid 2-benzyloxycyclohexanone, 0.10 mole, ammonium bicarbonate, 24 g. (0.30 mole), and concentrated ammonium hydroxide, 20 ml. are dissolved in 100 ml. of ethanol and 30 ml. of water and warmed to 55° C. Potassium cyanide, 9.8 g. (0.15 mole) in 50 ml. of water was added over 30 minutes and the solution was held at 55–60° for 3 hours and then heated to boiling to remove ethanol and excess ammonium carbonate. The solution was cooled and extracted with ether, and the aqueous phase was acidified to pH 2 with hydrochloric acid and the precipitate was filtered off. Yield 5.3 g. (19% of theory); M.P. 184–186° after drying at 100° C. overnight. The IR spectrum showed typical peaks for the hydantoin portion, the ether linkage, and aromatic peaks.

The ether extracts were extracted with 5% sodium hydroxide, and the aqueous layer was acidified. An additional yield fo 7.3 g. was obtained; M.P. 183–186°. Total yield 12.6 g. (46% of theory). $N_{calc.}$ 10.3%; $N_{found}$ 10.21%.

The hydantoin from 2-benzyloxycyclohexanone, 41 g. (0.15 mole), barium hydroxide hydrate, 157 g. (0.5 mole), and 300 ml. of water were heated in a steel bomb at 200° for 20 hours. The mixture was dissolved in 300 ml. of 4 N hydrochloric acid, and the barium removed as barium sulfate with 28 ml. of concentrated sulfuric acid. The filtrate was evaporated to dryness, redissolved in 250 ml. water, adjusted to pH 4.5 with dilute sodium hydroxide, and allowed to crystallize. The filtrate was evaporated to dryness and extracted with hot ethanol and filtered. The ethanol extract was evaporated to dryness. The two crude products were combined, redissolved in dilute hydrochloric acid, treated with charcoal, and adjusted to pH 5 with dilute sodium hydroxide. The solution was then warmed on the steam bath and filtered. The precipitated solid was then recrystallized from hot absolute ethanol to obtain the title compound.

Yield 14.5 g. (39% theory); M.P. 229–232° (dec.).

*Analysis.*—Calc'd (percent): C, 67.45; H, 7.68; N, 5.60. Found (percent): C, 67.33; H, 7.77; N, 6.00.

Following the above example, one may similarly prepare, for example, 1-methylamino-3-methylcyclopentacarboxylic acid, 1-amino-2-ethoxycyclohexanecarboxylic acid, 2-benzyloxy-1-methylaminocyclopentanecarboxylic acid, or 1-amino-2-benzylcyclohexanecarboxylic acid.

The following example illustrates in greater detail the separate steps involve in producing the compounds of the invention.

EXAMPLE 2

7-(1-aminocyclopentanecarboxamido) cephalosporanic acid (VII)

(a) Preparation of compounds II and III: 1-aminocyclopentanecarboxylic acid (12.9 g.; 0.100 mole) was dissolved in 2 N sodium hydroxide (50 ml.), and dioxane (125 ml.) was added. o-Nitrobenzenesulfenyl chloride (21.0 g.; 0.110 mole) and 2 N sodium hydroxide (60 ml.) were added separately over a 15 minute period. After 1 hour the reaction mixture was poured into water (1250 ml.), and filtered. The filtrate was acidified to pH 2 and extracted 3 times with ethyl acetate (300 ml. portions). The extract containing compound II was washed 3 times with water (500 ml. portions) and dehydrated with anhydrous sodium sulfate. Dicyclohexylamine (20 ml.) was added to the extract, and the resulting salt (III) was filtered off after storage overnight at 5°; M.P. 191–93° C.

*Analysis.*—Calc'd for $C_{24}H_{37}N_3O_4S$ (percent): C, 62.6; H, 8.0; N, 9.1. Found (percent): C, 62.5; H, 8.4; N, 9.0.

(b) Preparation of compounds IV and VI: A mixture of 2.13 g. of 1(o-nitrobenzenesulfenamido)cyclopentanecarboxylic acid dicyclohexylammonium salt (III) (0.005 mole), 5.0 ml., 1.0 N sulfuric acid (0.005 eq.), and 100 ml. ethyl acetate was stirred for 10 minutes and the solution was washed with 3×50 ml. of water to remove the base salt. The organic layer was dehydrated with anhydrous sodium sulfate for 1 hour, filtered, and concentrated to an oil. The oil was taken up in acetone and concentrated to an oil two times before solution in 42 ml. of acetone.

The solution of the free acid was chilled to 0°, and 0.49 ml. of ethylchloroformate (0.005 mole) and 0.83 ml. of triethylamine (0.006 mole) were added with stirring. After 10 minutes, the suspension, containing compound IV, was cooled to −50° in a Dry-Ice-acetone bath and stirred vigorously during the addition of an ice-cold solution of 1.63 g., 7–ACA (0.006 mole) in 42 ml. of 3% sodium bicarbonate. The solution was stirred for 30 minutes at 0° and 30 minutes at 25°. The reaction mixture was washed with 3×40 ml. of ether; the aqueous phase and adjusted to pH 2.0 with 6 N hydrochloric acid and extracted with 3×40 ml. of methyl isobutyl ketone (a thick emulsion forms). The organic phase was dehydrated with sodium sulfate, filtered, and concentrated to an oil which slowly partially crystallized on standing (compound VI).

Spectrum: $\lambda_{max.}^{film}$ 6.05, 6.40 microns (amide I and II bands)

The sodium salt of 7-[1(o-nitrobenzenesulfenamido) cyclopentanecarboxamido]cephalosporanic acid (VI) was prepared by treating an aliquot of the methyl isobutyl ketone solution described above with an equal volume of ice-water and adjusting the pH to 6.0 with 3% sodium bicarbonate, separating the phases, and freeze-drying the aqueous phase after a preliminary concentration.

(c) Preparation of compounds VII: 0.45 mmole of (VI) was unblocked by solution in 3.6 ml. pyridine and the addition of 0.07 ml. (1 drop) thiophenol. After 1 hour, 11 ml. of ether was added, and the precipitate was filtered off and washed with ether. The precipitate was dried in air and in the desiccator to give 28 mg. of the title product.

*Analysis.*—Calc'd for $C_{16}H_{21}N_2O_6S \cdot 1\frac{1}{2}H_2O$ (percent): C, 46.8; H, 5.9; N, 10.2; S, 7.8. Found (percent): C, 47.2; H, 5.4; N, 9.7; S, 7.6.

Using standard testing techniques for microbiological determination of antibiotic effects, in this case, an agar serial dilution in vitro test, the minimal inhibitory concentration (MIC) indicating the least amount of compound VI, specifically 7-[1(o-nitrobenzenesulfenamido)-cyclopentanecarboxamido]cephalosporanic acid and compound VII, specifically, 7-(1-aminocyclopentanecarboxamido)cephalosporanic acid completely inhibiting the following test organisms is shown in the table below.

TABLE

| Organism | | MIC, μg./ml. |
|---|---|---|
| Compound: | | |
| VI | Bacillus subtilis _____ ATCC 6633 ____ | 15.6 |
| | Bordetella bronchiseptica ___ ATCC 4617 ____ | 125 |
| | Enterobacter aerogenes _____ ATCC 884 _____ | 62.5 |
| | Escherichia coli _____ ATCC 6880 ____ | 62.5 |
| | Escherichia intermedia _____ ATCC 65-1 ____ | 125 |
| | Klebsiella pneumoniae _____ ATCC 10031 ____ | 62.5 |
| | Proteus vulgaris _____ ATCC 6896 ____ | 125 |
| | Salmonella paratyphi _____ ATCC 11737 ____ | 62.5 |
| | Staphylococcus aureus _____ ATCC 6538P ___ | 7.81 |
| | ___do_____ Smith _____ | 3.90 |
| | ___do_____ ATCC 53-180 ___ | 15.6 |
| VII | Bacillus subtilis _____ ATCC 6633 ____ | 62.5 |
| | Enterobacter aerogenes _____ ATCC 884 _____ | 125 |
| | Escherichia coli _____ ATCC 6880 ____ | 125 |
| | Escherichia intermedia _____ ATCC 65-1 ____ | 250 |
| | Klebsiella pneumoniae _____ ATCC 10031 ____ | 250 |
| | Proteus vulgaris _____ ATCC 6896 ____ | 250 |
| | Salmonella paratyphi _____ ATCC 11737 ___ | 125 |
| | Staphylococcus aureus _____ ATCC 6538P ___ | 31.3 |
| | ___do_____ Smith _____ | 31.3 |
| | ___do_____ ATCC 53-180 ___ | 125 |

Following the step-wise procedure of Example 2, using equivalent amounts of substituted and unsubstituted cycloalkenecarboxylic acids (compound I) and 7-aminocephalosporanic acids, or 7-amino-3-methyl-3-cephem-4-carboxylic acid, or in place of methyl in the 3-position of the latter reactant, having a 3-hydroxymethyl radical (compound V), the following additional illustrative compounds (VI and VII) would be prepared, falling within the scope of the described and claimed invention, with the indicated meanings for the symbols $R_1$, $R_2$, $R_3$, and $R_4$ in the formula:

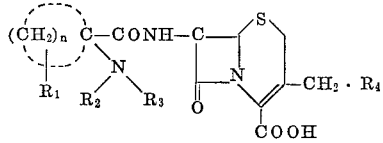

COOH

| n | $R_1$ | $R_2$ | $R_3$ | $R_4$ |
|---|---|---|---|---|
| 4 | 3-$CH_3$ | H | H or $C_6H_4NO_2S$ | $OCOCH_3$ |
| 4 | H | $CH_3$ | Same as above | Same. |
| 4 | 2-$C_4H_9$ | H | ___do___ | Do. |
| 4 | H | H | ___do___ | H |
| 4 | H | H | ___do___ | OH |
| 4 | 2-$CH_2C_6H_5$ | H | ___do___ | $OCOCH_3$ |
| 5 | 2-$OCH_2C_6H_5$ | $CH_3$ | ___do___ | Same. |
| 5 | 3-$CH_3$ | H | ___do___ | Do. |
| 5 | H | H | ___do___ | Do. |
| 5 | 2-$OC_2H_5$ | H | ___do___ | Do. |
| 5 | H | $CH_3$ | ___do___ | Do. |
| 5 | H | H | ___do___ | OH |
| 5 | 4-$CH(CH_3)_2$ | H | ___do___ | $OCOCH_3$ |

As illustrated by the microbial tests shown above, the compounds of the invention are useful as antibiotic agents showing activity against specific gram positive and gram negative organisms. They may be used alone or with other antibiotics and may be incorporated in solid or liquid compositions where an antimicrobial effect is desired, for example, as topical compositions utilizing a lanolin-containing cream base. They are also deemed of value for veterinary applications either in oral or parenteral compositions with or without carriers, extenders, or inert diluents in well-known solid or liquid forms.

If it is desired to have as a final compound a pharmaceutically acceptable cation other than sodium, treatment of the acid with the proper base in place of sodium bicarbonate will produce the desired salt.

Compounds of the invention having a strongly basic moiety are capable of forming acid-addition salts and it is therefore contemplated that relatively nontoxic acid-addition salts of the cephalosporins may be prepared by well-known means. These compounds are considered the full equivalent, from an antibiotic standpoint, with the free cephalosporins.

The invention claimed is:

1. A compound selected from the group consisting of a cephalosporin having the formula:

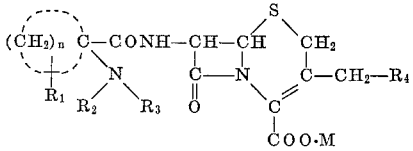

in which the symbol $n$ represents the integer 4; $R_1$ is hydrogen; $R_2$ is hydrogen; $R_3$ is a member of the group consisting of hydrogen and o-nitrophenylthio; $R_4$ is a member of the group consisting of hydrogen, acetoxy, and hydroxy; while M is selected from the group consisting of hydrogen and a pharmaceutically acceptable cation; and nontoxic acid-addition salts thereof when M is hydrogen.

2. A compound of claim 1; in which $R_1$ and $R_2$ are each hydrogen; $R_3$ is o-nitrophenylthio; and $R_4$ is acetoxy.

3. A compound of claim 1; in which $R_1$, $R_2$, and $R_3$ are each hydrogen and $R_4$ is acetoxy.

4. 7 - [1(o-nitrobenzenesulfenamido)cyclopentanecarboxamido]cephalosporanic acid, as a compound of claim 1.

5. 7 - (1-aminocyclopentanecarboxamido)cephalosporanic acid, as a compound of claim 1.

References Cited

UNITED STATES PATENTS

| | | | |
|---|---|---|---|
| 3,351,586 | 11/1967 | Grant et al. | 260—239.1 |
| 3,457,257 | 7/1969 | Hanessian et al. | 260—243C |

NICHOLAS S. RIZZO, Primary Examiner

U.S. Cl. X.R.

424—246